3,195,938
COUPLING MEANS FOR BUILDING FRAME-
WORKS, RACKS, SCAFFOLDS, AND THE LIKE
Louis L. Rifken, 122 S. Grove, Elgin, Ill.
Filed Apr. 9, 1962, Ser. No. 185,958
2 Claims. (Cl. 287—54)

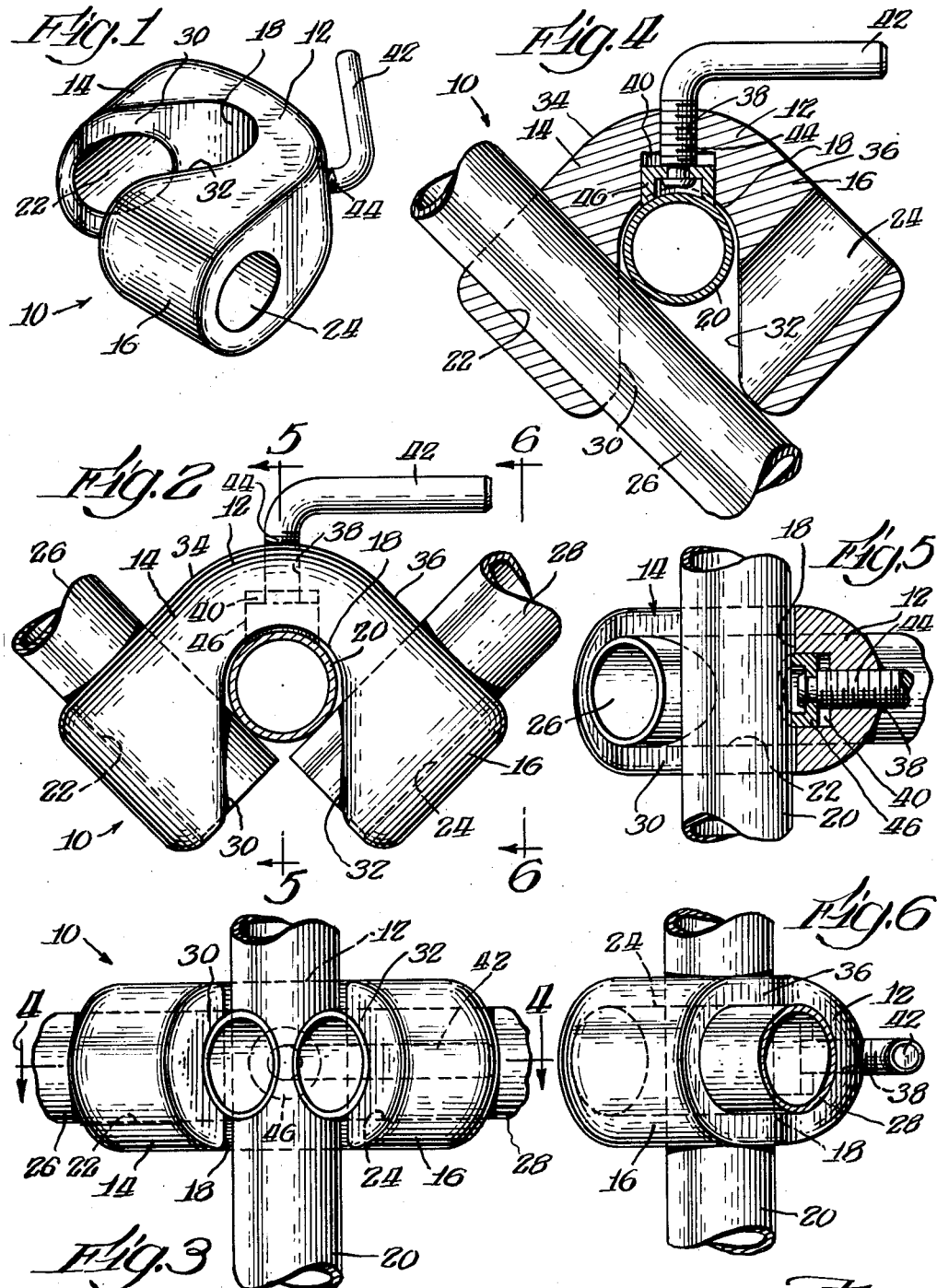

This invention relates to improvements in coupling means for building frameworks, racks, scaffolds and the like.

One of the objects of this invention is to provide an integrally formed coupling member adapted to interlock and couple two or three framework members in a positively locked position.

Another object of this invention is to provide a structure of the foregoing character which may be cast or formed of metal, which is relatively inexpensive to manufacture, which is strudy and durable and effectively couples the parts together and retains them in coupled position, and which is easy and quick to use.

Another object of this invention is to provide a structure in which the framework members are positioned so that two of the framework members have their axes at right angles to each other with said axes intersecting and with one of the framework members confined between the unit and the intersecting frameworks, all held together by a single fastening member.

Other objects and advantages will become apparent as this description progresses.

In the drawings:

FIGURE 1 is a perspective view of the coupling member;

FIGURE 2 is a plan elevational view of same coupled with three framework members;

FIGURE 3 is a front elevational view of FIGURE 2;

FIGURE 4 is a view taken on lines 4—4 of FIGURE 3, showing two framework members coupled;

FIGURE 5 is a view taken on lines 5—5 of FIGURE 2, and

FIGURE 6 is a view taken on lines 6—6 of FIGURE 2.

The coupling member comprises a single integrally formed member generally indicated at 10, which may be cast or formed of metal or the like. The said member is of generally C-shape in plan elevation, as best shown in FIGURE 2, and is provided with a central body portion 12 from which outwardly extends a pair of arms or sections 14 and 16. The central body portion 12 has a generally U-shaped recess 18 which forms a central socket for receiving a framework member such as a tube, pipe, or the like, designated by the numeral 20.

Each of the arms or sections 14 and 16 has an opening for the purpose of each receiving a separate framework member. The opening 22 in arm 14 has its axis perpendicular or at right angles to the axis of opening 24 in arm 16. The axes of openings 22 and 24 intersect or meet within the outer borders of the arms or sections 12 and 14 of member 10. Each receives a framework member designated respectively by the numerals 26 and 28.

The inner face or wall 30 of arm or section 14 inclines at an angle with respect to the framework member 26 and the inner face or wall 32 of arm or section 16 inclines at an angle with respect to the framework member 28. The outer end wall surfaces 34 and 36 respectively of the arms or sections 12 and 14 are disposed in planes perpendicular to each other, while the inner faces or walls 30 and 32 of the arms outwardly of the central socket are angularly disposed but are substantially parallel to each other.

The central body portion 12 has a threaded bore 38 whose axis is perpendicular to the longitudinal axis of the recess 18, as best seen in FIGURE 5. It is also provided with a communicating larger bore 40. An L-shaped fastening member 42 has a threaded shank 44 in engagement with the threaded bore 38. The shank 44 supports at the inner end thereof a gripping element 46 which is supported in the larger bore 40 and which when the handle end of member 42 is rotated will advance the gripping element 46 into and out of the larger bore 40 for engagement with framework member 20, as best seen in FIGURES 4 and 5. The gripping element 46 has a curved surface for engagement with the framework member 20. It also swivels with respect to the rotating member 42.

This coupling device may serve to couple two framework members as shown in FIGURE 4, or three framework members as shown in FIGURE 2. If two framework members are coupled, one of the framework members must be positioned in the central recess 18 and the other may be positioned in either of the openings 22 or 24 in either arm. With two framework members, it is preferred that the framework 26 be positioned as shown in FIGURE 4 to close the open space between the two arms or sections 14 and 16. As shown in FIGURE 4, tightening of the fastening member 42 will cause the framework member 20 to engage the framework member 26 to lock the two together.

When three framework members are interlocked, as shown in FIGURE 2, the central framework member 20 is urged against both framework members 26 and 28 to interlock all three. A single fastening member 42 controls the interlocking and coupling of the two or three framework members. The inner ends of the framework members may be positioned further inwardly from that shown in FIGURE 2 so that they engage each other, or one framework member may be positioned further inwardly with the other remaining positioned as shown. The framework member 20 will be the vertical support, with the framework members 26 and 28 forming the horizontal members, thus, the coupling member 10 is positioned so that FIGURE 2 is the top plan view of same when it is connected in coupling position.

It will be understood that various changes and modifications may be made from the foregoing without departing from the spirit and scope of the appended claims.

What is claimed is:

1. A coupling member comprising a body portion having a recess formed centrally thereof and having two opposed sides and a bottom, the bottom forming a central socket adopted to receive a framework member, arms extending outwardly of and as continuations of said body portion, each arm having an opening each adapted to receive a separate framework member, the axis of one opening intersecting the axis of the other opening at a point in a plane passing through the central portion of said bottom and the longitudinal axis of said central socket extending transversely to the axes of said openings, the axis of said central socket being positioned between the bottom of the member and said point of intersection, and a locking member secured in said body and extending into said central socket to engage the framework in said central socket and urge it against the frameworks in said openings to couple same together.

2. A structure defined in claim 1 in which the inner faces of the arms adjacent the openings are generally parallel.

References Cited by the Examiner
FOREIGN PATENTS
631,786  11/49  Great Britain.
677,347  8/52   Great Britain.
811,427  4/59   Great Britain.

CARL W. TOMLIN, Primary Examiner.

WALTER A. SCHEEL, Examiner.